United States Patent
Archer et al.

(10) Patent No.: US 9,349,015 B1
(45) Date of Patent: May 24, 2016

(54) PROGRAMMATICALLY DETECTING COLLUSION-BASED SECURITY POLICY VIOLATIONS

(71) Applicant: Galois, Inc., Portland, OR (US)

(72) Inventors: David W. Archer, Sherwood, OR (US); Jonathan T. Daugherty, Portland, OR (US); Joseph Hurd, Portland, OR (US); M. Isaac Jones, Portland, OR (US); Aaron Tomb, Portland, OR (US)

(73) Assignee: Galois, Inc., Portland, OR (US)

( * ) Notice: Subject to any disclaimer, the term of this patent is extended or adjusted under 35 U.S.C. 154(b) by 37 days.

(21) Appl. No.: 13/916,486

(22) Filed: Jun. 12, 2013

Related U.S. Application Data

(60) Provisional application No. 61/658,763, filed on Jun. 12, 2012.

(51) Int. Cl.
*G06F 12/16* (2006.01)
*G06F 21/60* (2013.01)
*G06F 12/14* (2006.01)

(52) U.S. Cl.
CPC ....................................... *G06F 21/60* (2013.01)

(58) Field of Classification Search
None
See application file for complete search history.

(56) References Cited

U.S. PATENT DOCUMENTS

| | | | |
|---|---|---|---|
| 7,937,755 B1* | 5/2011 | Guruswamy | 726/22 |
| 8,265,595 B1* | 9/2012 | Reeves et al. | 455/410 |
| 2002/0183056 A1* | 12/2002 | Lundblade et al. | 455/425 |
| 2012/0158949 A1* | 6/2012 | Lee | 709/224 |
| 2013/0081138 A1* | 3/2013 | Rados et al. | 726/23 |
| 2013/0097652 A1* | 4/2013 | Bhattacharjee et al. | 726/1 |
| 2013/0111593 A1* | 5/2013 | Shankar et al. | 726/25 |
| 2013/0232573 A1* | 9/2013 | Saidi et al. | 726/22 |
| 2013/0268667 A1* | 10/2013 | Abuelsaad et al. | 709/225 |
| 2013/0290709 A1* | 10/2013 | Muppidi et al. | 713/168 |

OTHER PUBLICATIONS

Chin et al., "Analyzing Inter-Application Communication in Android", 2011, MobiSys'11, entire article.*

(Continued)

*Primary Examiner* — Shin-Hon Chen
(74) *Attorney, Agent, or Firm* — Klarquist Sparkman, LLP

(57) ABSTRACT

Sets of multiple software programs selected from a set of candidate software programs are evaluated to determine if the applications can collude to violate a security policy and exhibit other undesirable properties. Intra- and inter-application data and control flows can be stored and newly introduced applications assessed based on stored data and control flows. An application provider can certify sets of applications as satisfying a security policy based on consideration of inter-application flows.

18 Claims, 13 Drawing Sheets

(56) References Cited

OTHER PUBLICATIONS

Burke et al., "Automatic Detection of Inter-application Permission Leaks in Android Applications", Jan. 2013, Technical Report TR13-02, Department of Computer Science, Rice University, entire article.*
Cozzette et al., "Improving the Security of Android Inter-Component Communication", 2013, 2013 IFIP/IEEE International Symposium on Integrated Network Management, pp. 808-811.*
SBIR Phase 1 Final Report "FUSE: Inter-Application Security for Android," 20 pages (Dec. 2011).
Livshits, "Improving Software Security with Precise Static and Runtime Analysis," Dissertation, 250 pages (Dec. 2006).
J. Burns, "Developing Secure Mobile Applications for Android," iSEC Partners, 28 pages (Oct. 2008).
J. Burns, "Exploratory Android Surgery", iSEC Partners, 47 pages (2009).
A. Chaudhuri, "Language-Based Security on Android," in Proceedings of the 2009 Workshop on Programming Language and Analysis for Security, 2 pages (Jun. 2009).
A.P. Fuchs et al., "SCanDroid: Automated Security Certification of Android Applications", 15 pages (2010).

* cited by examiner

Extended Package Manifest (Excerpt from a password safe)

```
<service android:name=".service.ServiceDispatchImpl">
<intent-call>
<action android:name="org.openintents.action.CRYPTO_LOGGED_OUT" />
</intent-call>
<intent-filter>
<action android:name=".safe.service.ServiceDispatchImpl" />
</intent-filter>
</service>
```

FIG. 9A

PROGRAMMATICALLY DETECTING COLLUSION-BASED SECURITY POLICY VIOLATIONS

CROSS REFERENCE TO RELATED APPLICATION

This application claims the benefit of U.S. Provisional Application 61/658,763, filed Jun. 12, 2012, which is incorporated herein by reference.

ACKNOWLEDGMENT OF GOVERNMENT SUPPORT

This invention was made with government support under contract W31P4Q-12-C-0024 awarded by the Defense Advanced Research Projects Agency. The government has certain rights in the invention.

FIELD

The disclosure pertains to detecting security policy violations in software applications.

BACKGROUND

Evaluation of computer software to identify the presence of computer viruses has become widespread. In some cases, network operators provide virus screening tools as part of their basic offerings, and implement these tools in a way that users may be barely aware of their presence. Typical virus screeners examine software to determine if previously identified malware signatures are present. Thus, conventional malware detection requires a prior identification of a malware signature, and such malware detection is necessarily reactive. In other conventional approaches, individual software programs are evaluated to determine possible violations of desired behavioral properties.

The widespread use of software programs ("applications") on mobile computing devices presents additional challenges. First, many such mobile device users store, enter, or receive personal or financial data with these devices, and security of this data is a prime concern. Second, these mobile devices typically include cameras and microphones that can be connected to wide area networks such as the Internet, so that unauthorized acquisition of images and sound with these devices, and transmission of the acquired data can be significant privacy violations. In addition, mobile devices are typically configured to report device location, and unauthorized reporting of this location can also represent a significant violation of personal privacy. Third, in many cases, users depend on the proper functioning of mobile devices for daily activities including workplace and personal communications (email, text, telephone), work and personal calendaring, and access to address books, financial information, news, and entertainment. The presence of malware or misbehaving applications on a personal mobile device can thus result in significant inconvenience. While conventional approaches can recognize malware after the fact based on malware signatures associated with individual applications, additional approaches are needed.

SUMMARY

Disclosed herein are methods and apparatus for evaluating whether sets of multiple software programs selected from a set of candidate software programs have the capability to collude to behave in ways that may violate security policies.

According to some disclosed methods, inter-application data flows associated with at least two applications are evaluated based on a predetermined security policy. An indication of whether or not the set of at least two applications satisfies the predetermined security policy can be provided based on the evaluation. In some examples, a security policy violation is associated with a particular application of the at least two applications or an indication is provided that at least one of the applications satisfies the predetermined security policy. In some alternatives, a certification message is prepared based on the evaluation associated with compliance with the predetermined security policy. In typical examples, the data flows are associated with data flows from application inputs to application outputs and to and from memory accessed by the applications. In some embodiments, inter-application data flows associated with the at least two applications are evaluated based on stored data flows associated with the at least two applications. According to some examples, application signatures are established and stored for the at least two applications, and the evaluation of inter-application data flows is based on the stored application signatures. In some alternatives, the security policy is selected from a set of security policies.

Application marketplaces comprise one or more servers configured to provide a listing of a plurality of available applications, and to provide an indication that the applications satisfy a security policy based on inter-application data flows. In typical examples, the indication of satisfaction of a security policy is based on application certifications associated with at least one application in the set of available applications.

Methods comprise communicating a list of available applications, and indicating whether or not each of the applications satisfies a security policy based on inter-application data flows. In some embodiments, the security policy corresponds to a received security policy preference. In further examples, the list of available applications is based on a received user security policy preference. In some examples, at least one computer readable medium is configured to store computer-executable instructions for such methods.

Mobile devices comprise a display configured to present to a user indications of detected inter-application security policy violations based on an application selected for installation on the mobile device. According to representative embodiments, a user interface is configured for user selection of a security policy associated with the detection of the security policy violations. In other examples, the mobile device is configured to communicate at least one of a security policy preference or an application set preference to an application provider.

In some examples, methods include selecting a set of applications and a security policy, and evaluating the set of applications for inter-application security policy violations based on the selected security policy. A security certification is transmitted indicating that the set of applications satisfies the selected security policy if the evaluation fails to detect a security policy violation. In representative examples, at least one of an indication of a security policy or an identification of at least one application of the set of applications is included in the security certification. According to some examples, the set of applications is evaluated based on application signatures associated with application control and information flows.

The foregoing and other features, and advantages of the disclosed technology will become more apparent from the following detailed description, which proceeds with reference to the accompanying figures.

BRIEF DESCRIPTION OF THE DRAWINGS

FIG. 9A illustrates a portion of a representative extended package manifest.

DETAILED DESCRIPTION

Figure 1:
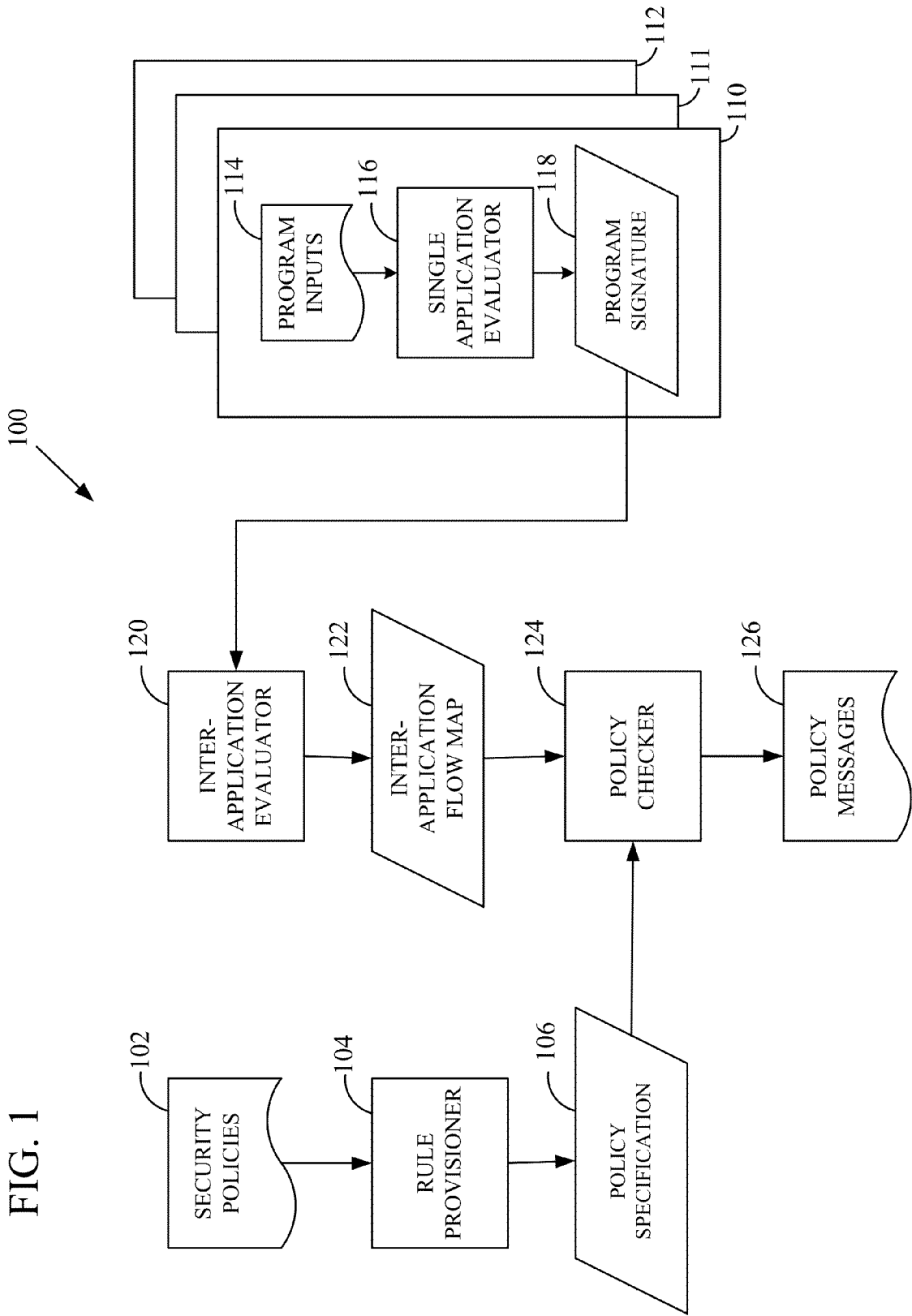
FIG. 1 illustrates a representative method and apparatus for evaluating applications for inter-application compliance with security policies.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Disclosed herein are representative methods and apparatus that permit detection of malware or flaws in software programs. In some examples, the methods and apparatus can be used to evaluate a set of software programs to determine if the software programs violate or are likely to violate predetermined acceptable program behaviors if operated together on a single computing device or multiple computing devices. In one or more examples, collections of inter-operating software programs are evaluated to estimate whether these programs might operate together in some fashion (i.e., collude) to violate one or more policies from a set of security policies. Such policies may often concern, but are not limited to preservation of computer system data privacy or computer system integrity.

In some disclosed embodiments, security policy violations are detected among colluding sets of software programs, and not merely policy violations within individual programs. Applications for some operating systems can be provided with a declaration of permissions required by the application to access hardware devices such as cameras and microphones, special or reserved data storage areas, and to communicate with other applications. Such permissions may be granted to a single application without any awareness of possible security violations for combinations of applications.

As disclosed herein security policies to be used in multi-application evaluation can be varied as desired for a particular security situation, and the effects of new or different security policies can be determined based on previously determined data path and control flows and application signatures, without requiring re-compilation of evaluator tools. Individual applications can be evaluated, and their signatures stored for later consideration in inter-application evaluations. In addition, security evaluation of a new software program added to a set of programs can be accomplished based on new sets of potentially colluding applications, and previous evaluations of other software program sets need not be redone. Typical security policies can be defined by limiting combined application access to specific system capabilities unless such access is explicitly granted.

In some examples, application signatures can be evaluated for some or all available applications at an application marketplace or elsewhere to discover colluding applications. Such colluding applications can then be noted as violating a security policy, and/or removed from availability. In other examples, inter-application security analysis on a set of applications is performed at installation. Security policy violations can be discovered, and a user advised so that installation can be halted, or an installed application removed.

In some application environments, applications can include components associated with activities that provide user access to the application, services that perform in the background, broadcast receivers that can receive communications from other applications, and content providers that permit shared data access. Components can call on other applications by requesting services from other applications. An application from which a service is requested can respond to the request (or not) based on predetermined criteria. Application components, permissions, and service criteria can be provided in an application manifest that can be presented to a user for approval at installation. Inter-application security violations can be assessed based in part on such manifests.

While software programs of all kinds can be evaluated, the disclosed examples are described with reference to so-called "applications." As used herein, an application is a software program that is configured for installation on a user device so as to be initiated by a user based on selection of a suitable icon or otherwise individually initiated. Applications are typically available for download from so-called application marketplaces, and as downloaded, may be part of an application package that includes installation information as well as application code in source, object, or executable format, or in a compressed format. Control and data flow analysis can be based on information available from application packages.

One example of the kinds of inter-application insecurity addressed by the disclosed method can be described as follows with reference to a security policy that prohibits communication of contact information to the Internet. A first application is installed and is granted (and requires) permission to access contact information. In addition, the first application is configured to require an additional permission in order to be accessible to a second application. This first application can be secure individually as it lacks any access to the Internet. A second application that provides access to the Internet is installed, and is granted permission to access the first application. The combination of the first and second applications thus presents a possible security policy violation in that contact information accessed by the first application is now accessible to the Internet through the second application, although both the first and second applications are individually secure.

Example 1

Multi-Application Evaluation

With reference to FIG. 1, a representative method 100 of evaluating applications includes preparing or assigning a set of security policies that can be stored in a security policy summary 102. Based on the security policy summary 102, a rules provisioner 104 is configured to establish security rules based on the policy summary 102, and produce a policy specification 106. In some examples, a policy specification is supplied by a user, one or more application developers, or an application marketplace, and evaluation of security policies and transformation into rules is not needed.

Typically, the rule provisioner 104 receives as input a set of rules, expressed in a suitable syntax. Some or all of the received rules are checked by the rule provisioner 104 for syntactic correctness. Some or all rules determined to be syntactically correct are then translated by the rule provisioner 104 into a computer-readable representation that may be directly used by a policy checker 124. The rule provisioner 104 generally outputs the computer-readable representation of the rules associated with the security policies for storage in one or more computer-readable media as the policy specification 106. The policy specification 106 and the security policies 102 can be stored at a common location that can be local or remote, or they can be stored partially or completely at different local or remote locations.

Security policies can be developed based on intended application behaviors. For example, a typical input rule, expressed in a typical suitable syntax, might be expressed as "No information shall flow from a contacts database to the Internet connection." Other rules could prohibit data flow from a password vault to the Internet connection, or prohibit data flows from personal financial application to a social networking application. Rules can also be tailored to intended users. For example, some data flows may be acceptable or appropriate for adult users, but inappropriate for non-adults. The security policy specification 106 can include such rules, and provide multiple rule sets that can be selected by a user. Alternatively, rule set compliance can be assessed as strict, intermediate, low, or non-compliant based on preferences associated with some or all security policies.

Individual application evaluations 110, 111, 112 can be provided to an inter-application evaluator 120. For example, the individual application evaluation 110 is based on determination of program inputs and outputs 114 for the selected application. Typically, the selected application is evaluated at 116 based on data flows between the inputs, outputs, and internal storage in conjunction with target operating system requirements and capabilities. Based on these data flows, a program signature 118 is established for use by an inter-application evaluator 120. The program signature 118 can provide a representation of some or all information flows associated with the selected application. In some cases, program signatures can be based in part on permission declarations as well as actual application code. Typically, all information flows are provided in the program signature 118. Similar program signatures can provide for additional applications based on the individual application evaluations 111, 112 as well. Applications can thus be evaluated one at a time in a compositional evaluation that is generally scalable to large numbers of applications. In addition to application data flow analysis, single applications can be evaluated by conventional virus scanners as well, and applications that fail to pass such evaluations can be flagged in subsequent evaluation, or removed from availability.

The single-application evaluator 116 generally receives interpretable or executable program code for selected applications. Based on a static program analysis, the evaluator 116 obtains a representation of information flows within the application under evaluation. Such an information flow representation can be based on some or all inputs to and outputs from the application under evaluation, along with internal storage locations accessed by the application. In addition, the representation can include all communication paths in the program that connect these inputs, outputs, and internal storage locations. As used herein, such a representation of inputs, outputs, storage locations, and communication paths between inputs, outputs, and storage locations is referred to as an information flow map and is typically stored in a computer-readable memory or other storage device. Such a flow map can be represented visually for user inspection, but such a visual display is only one possible format. The information flow map represents some, most, selected, or all information flow paths that may occur under any applied set of inputs or program controls. The resulting information flow map produced by the single application evaluator 116 is typically output as a representation corresponding to nodes and edges of an information flow graph. Typically, each node of such a graph represents an input, output, or internal storage location in the application under evaluation, and each edge in such a graph indicates the presence of software instructions in the application that may enable the flow of information from the storage location represented by one node to the storage location represented by another node. Such a representation can be referred to herein as a signature, or node-based signature of the evaluated software program. However, information flows can be stored in other ways, and a node-based signature is a convenient example.

An inter-application evaluator 120 receives program signatures corresponding to a set or sets of applications to be evaluated, and constructs an information flow representation that includes some, most, or all information flow paths between applications in the evaluation set. Such a representation can be referred to as an inter-application flow map, is output by the inter-application evaluator 116 and stored at 122.

A policy checker 124 is coupled to receive the policy specification 106 produced by the rule provisioner 104 and search the inter-application flow map 122 for possible information flows within and between the applications in the program set under evaluation that may result in program behavior prohibited by the policy specification 106. For some or all information flow paths that violate the policy specification 106, the policy checker 124 is configured to output one or more messages 126 indicating which portion of the policy specification is violated, along with an identifier that specifies the path associated with the violation.

Example 2

Application Marketplace Administration

Figure 2:
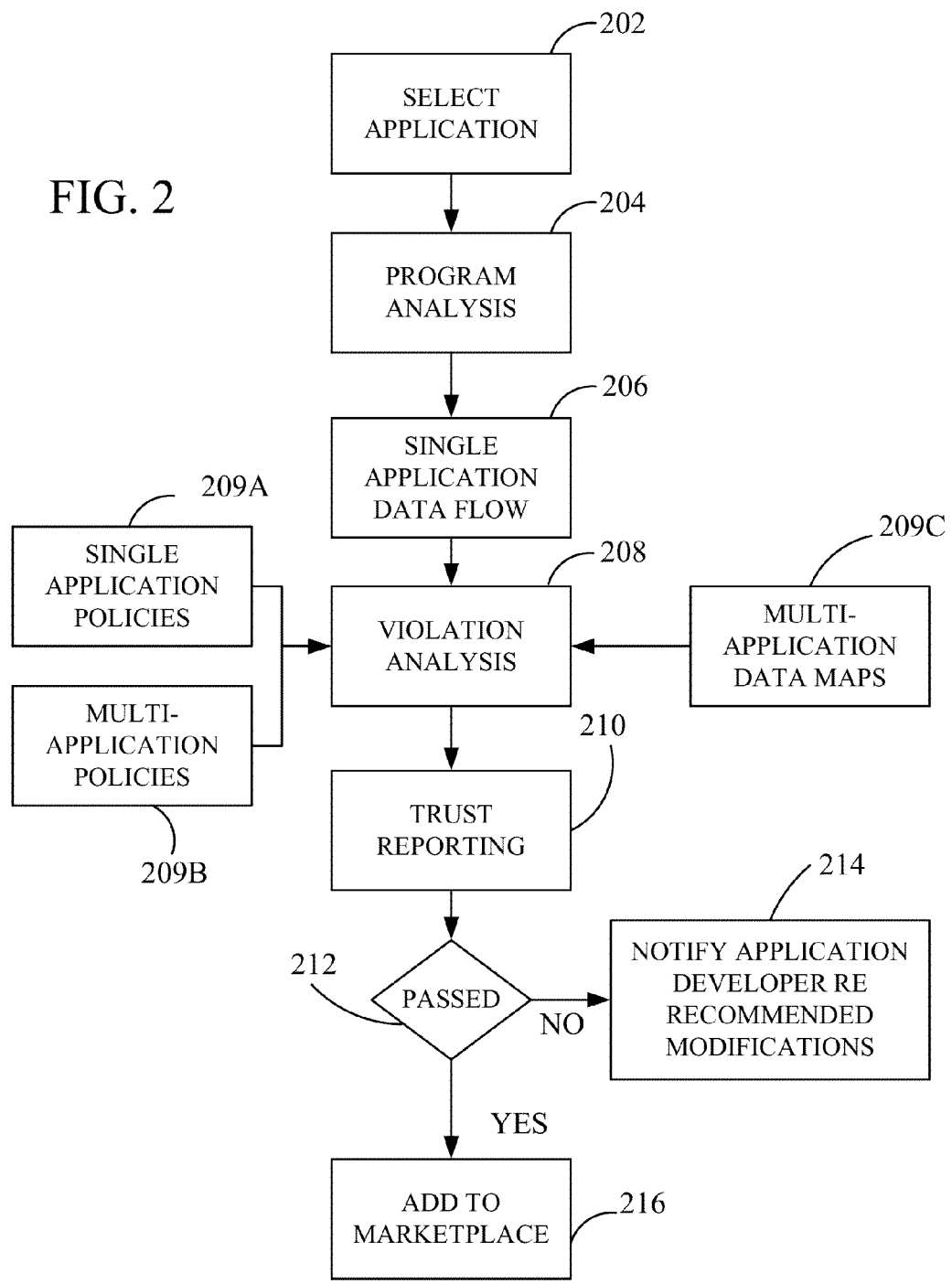
FIG. 2 illustrates a representative method for determining whether an application is to be approved for addition to an application marketplace.

With reference to FIG. 2, a representative method for use in marketplace administration comprises selecting a particular application for addition to a set of available, approved applications at 202. At 204, the selected application is analyzed to determine, for example, data inputs, data outputs, and accesses to data storage, and data flows are recorded as a single application map at 206. At 208, the single application data flows can be evaluated to identify violation of single application security policies 209A that can be stored in a database. In some cases, marketplace administrators can require application providers to submit a certification that an application being submitted satisfies single application security policies, and testing for single application policy violations is unnecessary. Alternatively a multi-application data path evaluation can be configured so that paths between applications and within one or more applications such as within a submitted application are considered. Typically, single application policies are established at least in part based on a selected operating system and associated policies.

The selected application can also be evaluated based on multi-application data maps 209C that are associated with at least a subset of the approved applications. Flow violations between or among applications and the submitted application can be established based on a multi-application security policy 209B using the data maps 209C. Based on the violation analysis at 208, a trust report can be generated at 210. A trust report can indicate whether or not violations were found, provide details concerning any violations such as an associated location in application code, indicate the relevant unapproved data flow path, or provide other information concerning violations. At 212, the trust report can be evaluated to determine if the selected application is to be added to the set of available applications in the application marketplace. If the selected application's trust report is acceptable, the application is added to the marketplace at 216. If not, at 214 a recommendation can be forwarded to an application developer or provider concerning potential corrective modifications.

Example 3

Distributed Application Evaluation

Figure 3:
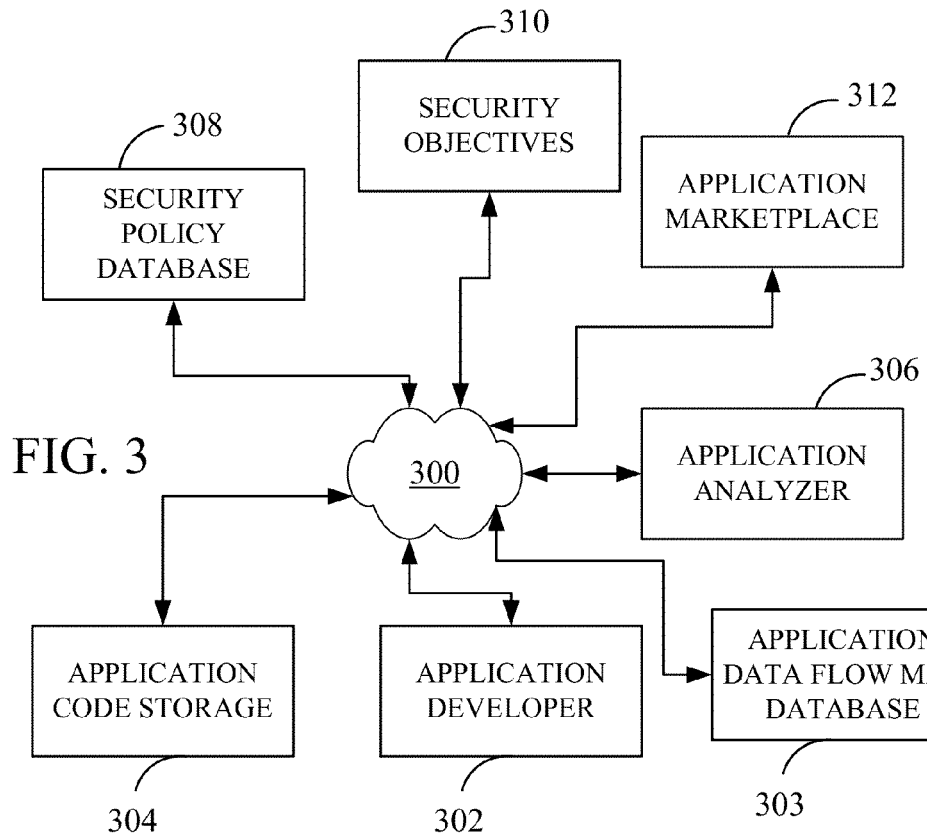
FIG. 3 illustrates a representative system for use by application developers in establishing conformance to application marketplace policies.

With reference to FIG. 3, an application developer 302 communicates via a wide area network 300 such as the Internet to an application storage system 304 that application code for a selected application be forwarded to an application analyzer 306. In some cases, then application analyzer 306 is under the control of the developer 302, but typically the application analyzer 306 is provided by an unaffiliated third party. The application analyzer 306 is coupled to receive one or more security policies from a security policy database 308 via the wide area network 308. The security policies can be established based on stored security objectives 310. The database 308 can include security policies associated with one or more application marketplaces, operating systems to which an application is adapted, selected security levels, and/or sets or other indications of applications against which the forwarded application is to be tested. Security policies are generally established based on security objectives 310 provided by the application market place or a third party.

The application analyzer 306 is configured to perform inter-application data flow analysis based on the forwarded application, and one or more applications already accepted for availability at an application marketplace 312. The application analyzer 306 can notify the application developer 302 whether or not the application satisfies any selected security policies based on the inter-application evaluation. If the application meets security policies, the application analyzer 306 can send a certification message with an application identifier to the application marketplace 312 or the application developer 302, or other destination. Single application data flow maps 303 can be provided by application developers, application security analyzers, or otherwise stored in a database for use by the application analyzer.

As shown in FIG. 3, various functions and services used in inter-application security analysis are distributed via a network. These functions and services can be provided by a single service provider or distributed among fewer providers than shown in FIG. 3. In some examples, an application marketplace may communicate with an application analyzer to provide security policies, objectives, application set for inter-application security analysis, and may control archival storage of application flow maps for some or all application offered by the application marketplace.

Example 4

Certification Messages

Figure 4:
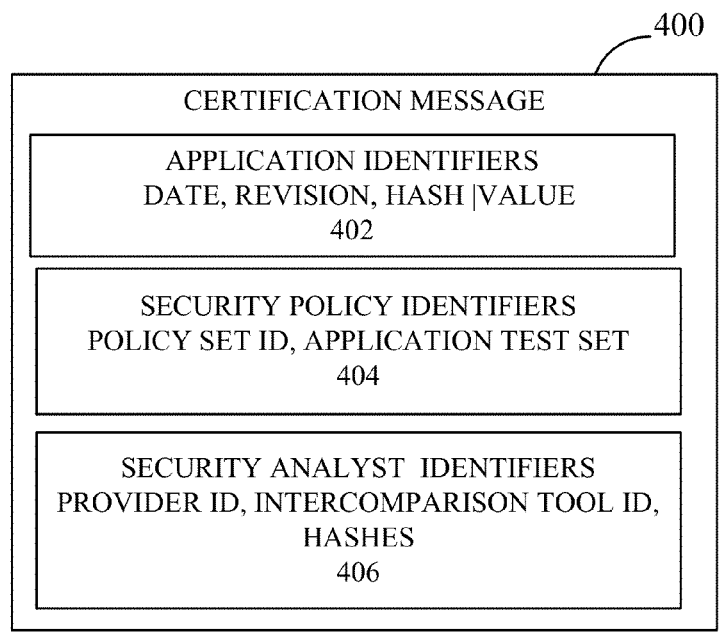
FIG. 4 illustrates a representative certification message.

FIG. 4 is a schematic diagram of a representative certification message 400. As shown in FIG. 4, the message 400 includes application identifiers 402 that are associated with the application as tested. An application revision number, a hash value derived from the application as tested, and an application date can be included. Security policy identifiers 404 such as an identifier of a security policy and an application test set can be included. Security analyst identifiers 406 can include analyst identifiers, one or more identifiers of an analysis tool used to evaluate the data flow paths such as tool name, revision number, or the like. Any of these fields of a certification message can be used to produce a hash value to assure that the certification message is uncorrupted, or the certification message can be hashed as whole.

Example 5

Application Developer Security Analysis

Figure 5:
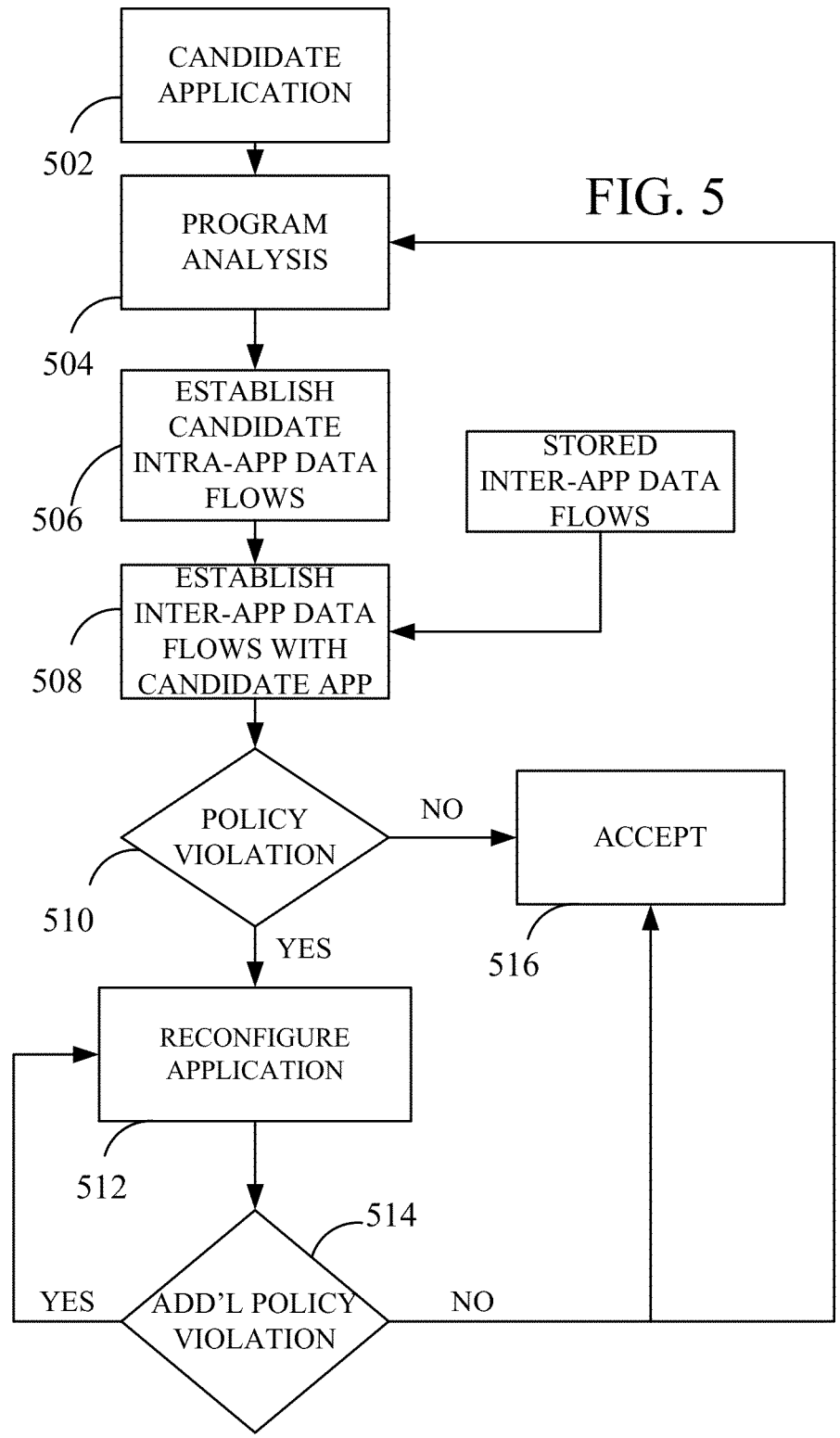
FIG. 5 illustrates a representative method of modifying an application to satisfy a security policy.

Application security analysis can also be implemented by and at an application developer. Referring to FIG. 5, a candidate application 502 is selected and subjected to program analysis 504. Intra-application data flows are established at 506 for the candidate application based on the program analysis, and inter-application data flows associated with the candidate application and a set of other applications are established at 508. Inter-application and intra-application data flows for the set of applications can be retrieved from a database, and re-computation of these values is not generally necessary. At 510, the flows are tested for security policy violations, and if none, the candidate application is noted as acceptable at 516. If violations are detected, the candidate application can be reconfigured at 512 to cure the violation(s), and tested for additional violations at 514. Once no policy violations are noted, the application can be noted as accepted as 516. In some cases, after correction of policy errors, the candidate application is re-evaluated to confirm that the violations have been corrected. Although not shown in FIG. 5, analysis of the candidate application can be used to add data flows for the candidate application to a pre-existing database of data flows.

Example 6

Mobile Device

Figure 6:
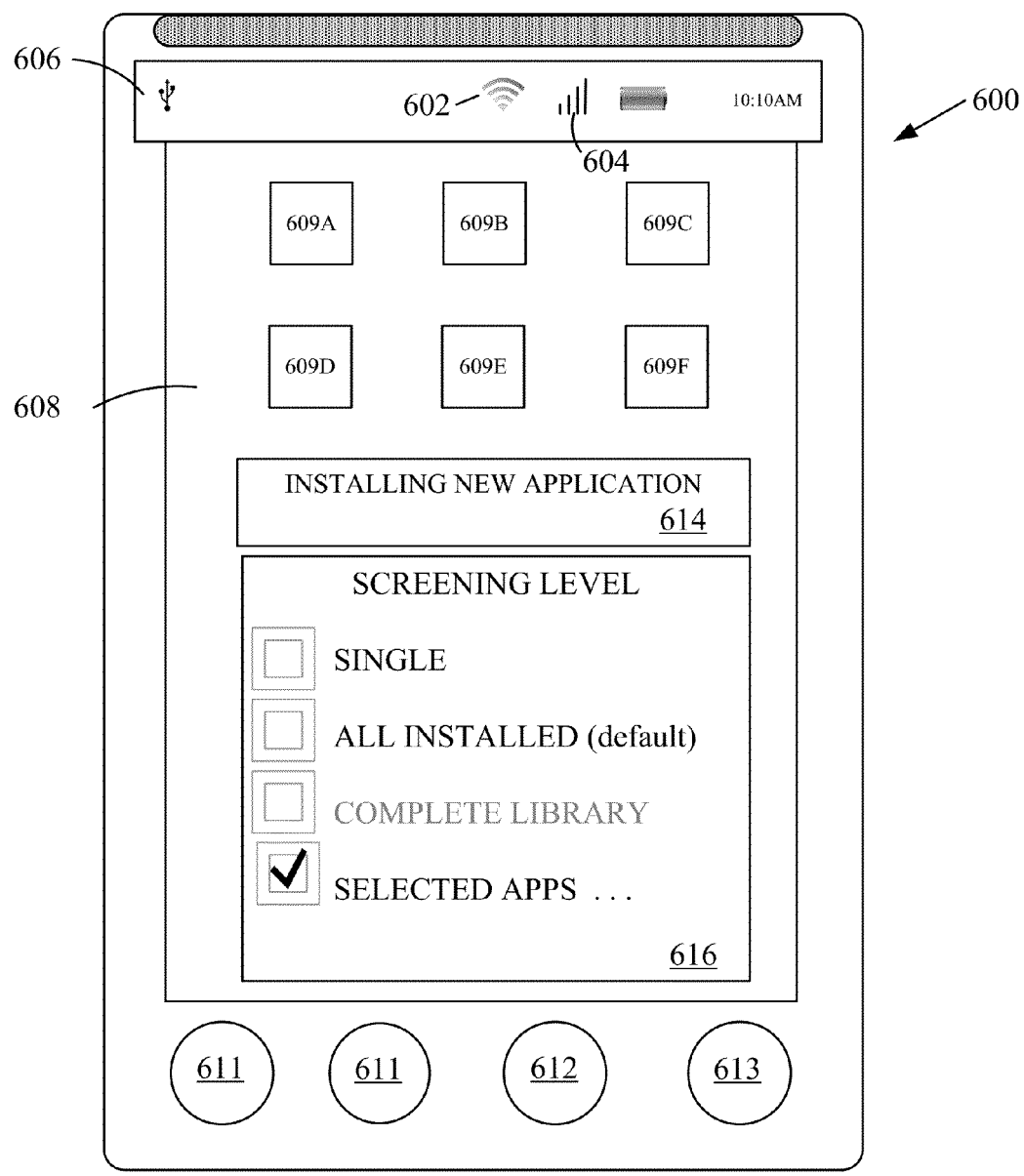
FIG. 6 illustrates a mobile device configured to permit user selection of inter-application security assessment parameters.

FIG. 6 illustrates a representative mobile device 600 configured to communicate with wireless networks such as so-called Wi-Fi networks, cellular networks, or via a wired connection. In FIG. 6, the availability of Wi-Fi and cellular networks is indicated with signal strength indicators 602, 604, respectively. Availability of a wired (Universal Serial Bus) connection is indicated by a connectivity icon 606.

The mobile device 600 includes a touch screen display 608 that is configured to display icons 609A-609F that can be selected by a user to initiate or activate the selected application. In some mobile devices, a portion of the touch screen display 608 is dedicated to particular applications, but generally applications can be selected and installed based on user preferences. One or more switches such as touch switches or push buttons 611-613 are also provided for mobile device control.

In FIG. 6, the mobile device 600 is shown during installation of a newly selected application from an application marketplace. A portion 614 of the touchscreen display indicates that application installation is in progress. Identifiers of custom security options are displayed in display portion 616. The security options are noted as "Screening Levels," and permit user selection of intra-application data flow evaluation only ("Single"), inter-application evaluation with all applications installed on the mobile device 600, or inter-application based on a subset of installed applications. A preferred option can be selected by touching the touch screen 608 at checkbox user input areas, and an arrow is then displayed in the selected checkbox. FIG. 6 also shows a security option "Complete Library," in which an application to be installed is to be checked with respect to all currently available apps. This option is shown in gray, indicating that it is currently unavailable. Based on user selection of such security options, the selected application is evaluated, typically at one or more remote servers, and a message associated with the evaluation is returned to the mobile device 600.

In other examples, the mobile device 600 can be configured to display menu selections associated with applications that are to be made available to the mobile device 600. For example, a user interface can be arranged so that applications associated with intra-application data flow analysis, inter-application analysis with selected or installed applications, or applications for which a complete inter-application analysis has been performed are indicated as being available to the mobile device. The mobile device 600 then generally transmits a request to the application market place or other application provider that only corresponding applications are of interest. In return, the application marketplace provides corresponding application inventories to the mobile device.

Example 7

Security Policy Selection

Figure 7:
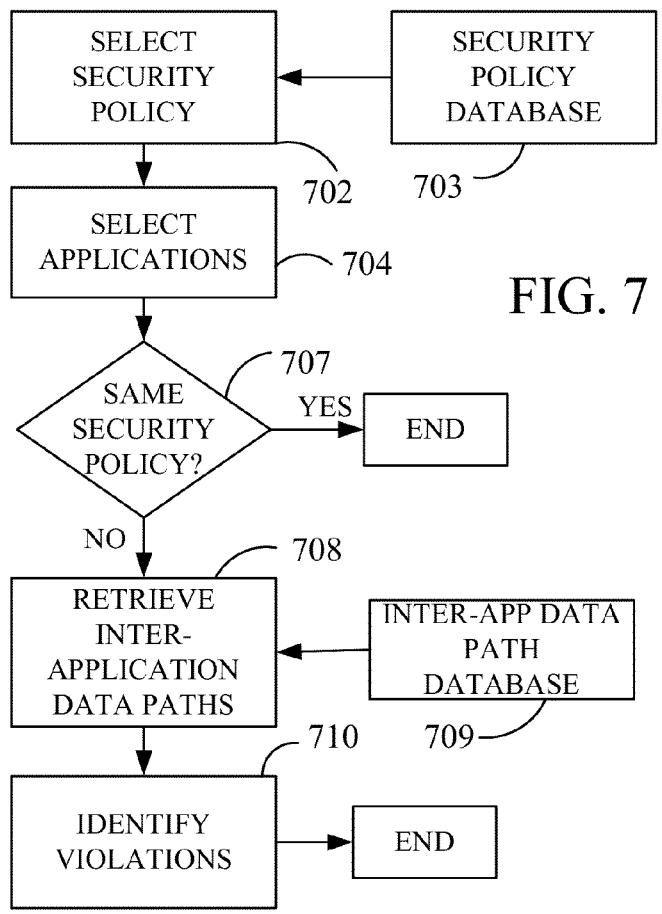
FIG. 7 illustrates a method of updating a security policy analysis of an application based on a newly selected or revised security policy.

As disclosed above, inter-application security policy violations can be detected based on data flows between applications. Determining which flows to designate as violations can depend on security requirements that vary over time, applications, and users. However, such variations in security policies can be readily accommodated as follows. Referring to FIG. 7, at 702 a security policy is selected from set of security policies that can be stored in a database 703, or a new security policy can be defined. One or more or a set of applications is selected at 704 to be evaluated with respect to the selected security policy. If the selected applications have been previously evaluated for inter-application based security policy violations as determined at 707, the security policy used for this evaluation can be compared with the selected security policy. If the security policy is substantially the same, additional evaluation may be unnecessary. For a new or different security policy, at 708 previously determined inter-application data paths can be retrieved from a database 709. Security policy violations can be determined at 710, but redetermination of data paths is unnecessary absent changes such as changes in one or more applications, addition of new applications for consideration, or operating system changes. An inter-application path database such as the database 709 can be made available for application developers to simplify new application evaluations.

Example 8

Addition of New Applications

Figure 8:
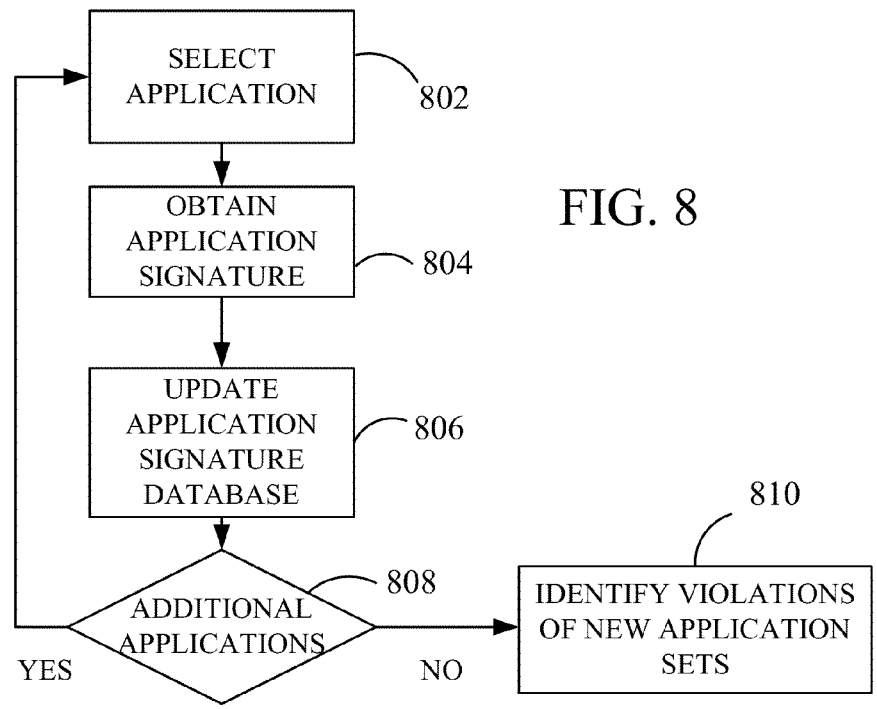
FIG. 8 illustrates addition of a new application to a set of previously evaluated applications.

Referring to FIG. 8, new or revised applications can be evaluated by selecting a new application at 802, and obtaining an application signature at 804. The application signature can be evaluated by extracting information from an application package manifest that describes potential application control and information flows. Static analysis of the application code can be automated to derive possible information flows from the application source. At 806, an application signature database is updated by adding the newly obtained application signature. At 808, if additional applications are to be considered, another application is selected at 802. If no additional applications are to be considered, at 810, violations in new application sets are located, if present at 810. Previously evaluated sets of applications do not require re-evaluation.

Example 9

Operating System Based Implementation

In one operating system environment, applications are made of components that include "activities" that provide a user interface to an application, "services" that perform actions in the background, "broadcast receivers" that receive messages from other applications, and "content providers" that store potentially-shared data. Application components communicate using "intents" that are composed of an optional action (e.g., EDIT), an optional target component (e.g., a specific editor), and optional meta-data (e.g., a file name).

Application components are annotated with "intent filters" that describe what intents they can respond to. Applications can protect critical components by specifying a permission that calling applications must have. Application components, permissions and intent filters can be specified in a "package manifest" which a user may approve at application installation. Most of the relevant information for an inter-application security analysis is readily available in package manifests as components, permissions and intent filters are provided. Security-relevant information can be automatically extracted from application packages.

Inter-application communication occurs in three steps. First, an intent object is created. Second, action, component or meta-data fields of the intent are set. Third, one of a set of application communication methods (startActivity, startService, etc.) is called. These methods are generally provided by the operating system in which the application is to be run. Occurrences of these steps can be identified by inspecting bytecode in an application package. Source code is unnecessary.

In one implementation, bytecode in the application is converted to equivalent Java bytecode so that readily available Java-based utilities can be used for bytecode parsing. An open source tool dex2jar can be used, and an open source apktool can be used to extract manifests from application packages.

Static analysis of the converted Java bytecode is performed to identify instructions that create new intent objects, that set intent action or component fields, or that identify application communication method calls (e.g., startService). For each method of an application component containing one instruction to create an intent object and one application communication method, one intent call is generated for the component. If an application component contains multiple intent object create instructions or communication calls, then intent calls for some or all possible combinations can be generated. The generated intent calls can be added to a package manifest, and the result output in an extended package manifest format.

Intent-filter tags already exist in package manifests to describe the form of intents a component can receive. An intent call tag can be added describing the form of intents a component can issue. An Extended Package Manifest excerpt with a representative intent call is shown in FIG. 9A.

Figure 10:
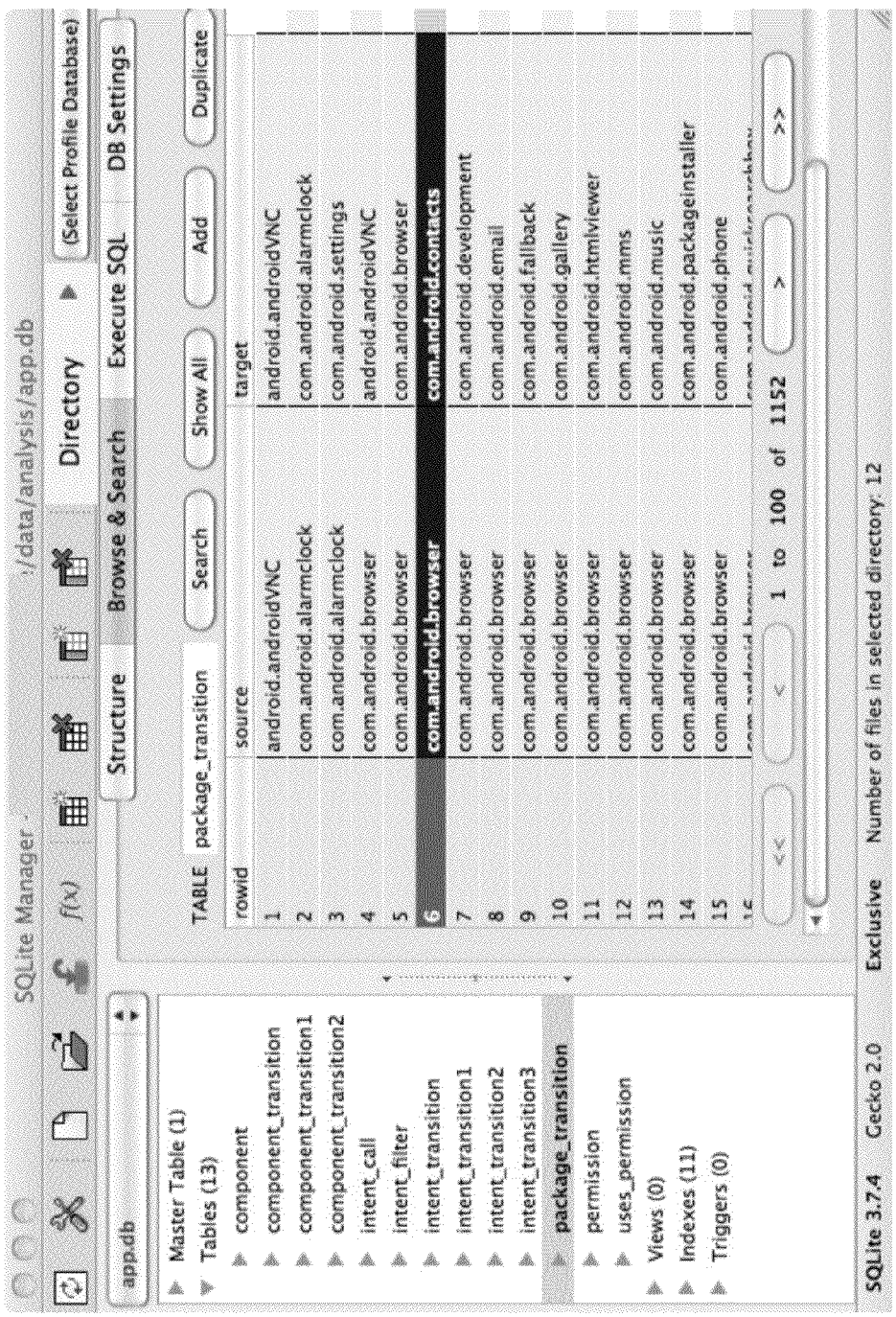
FIG. 10 is a listing of inter-application component calls.

In a feasibility study, an inter-application control flow analysis was provided based on a sequence of SQL statements. In an initialization step, for each application, information from the extended package manifest was added. Inter-application component calls were identified and a database table relating application components with matching intent calls and intent filters (respecting permissions) was generated. A database table projecting the inter-application component calls to the owning application was creating so that applications that may call each other were identified as shown in FIG. 10.

Figure 11:
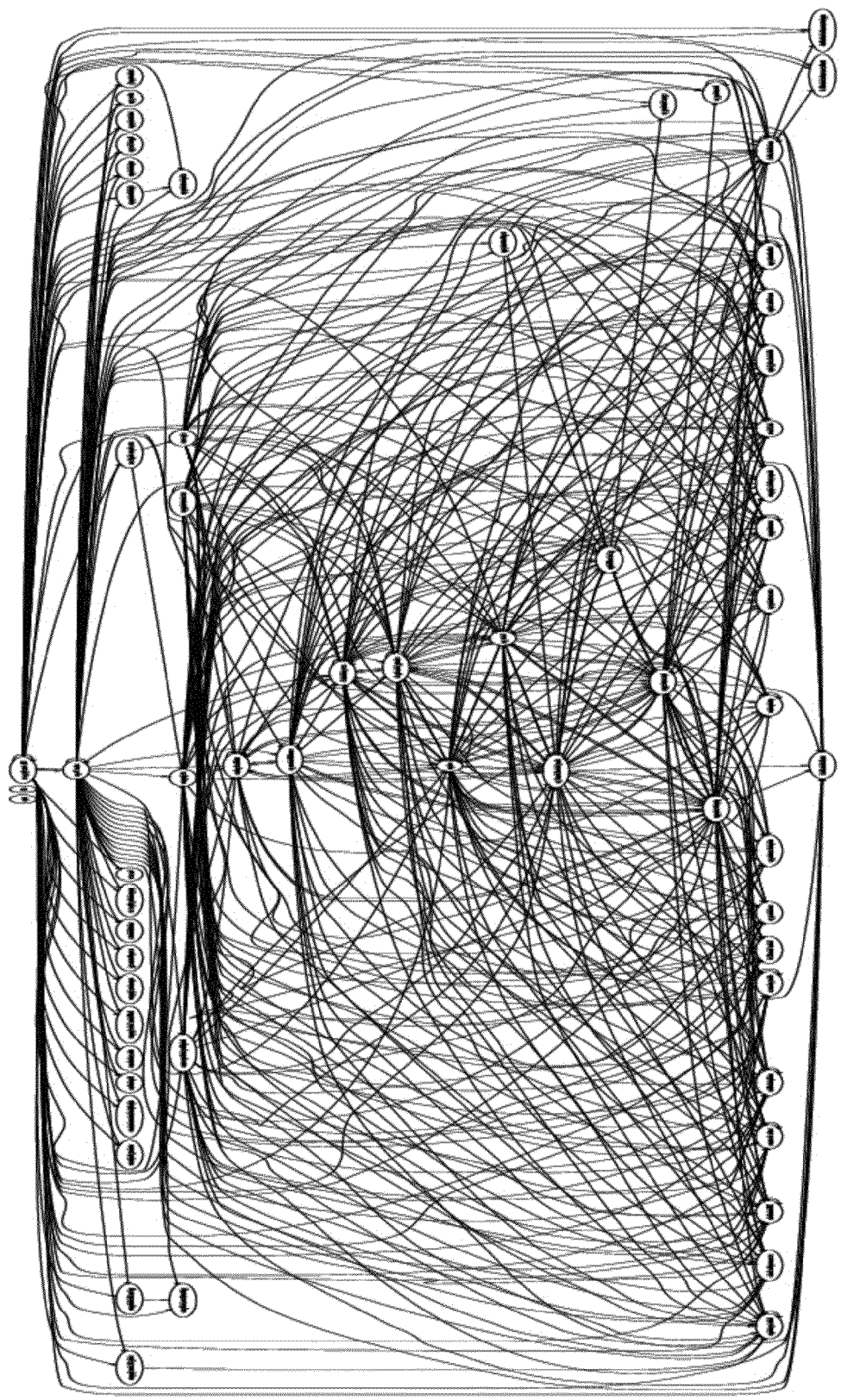
FIG. 11 is a representation of inter-application control-flow data.
Figure 12:
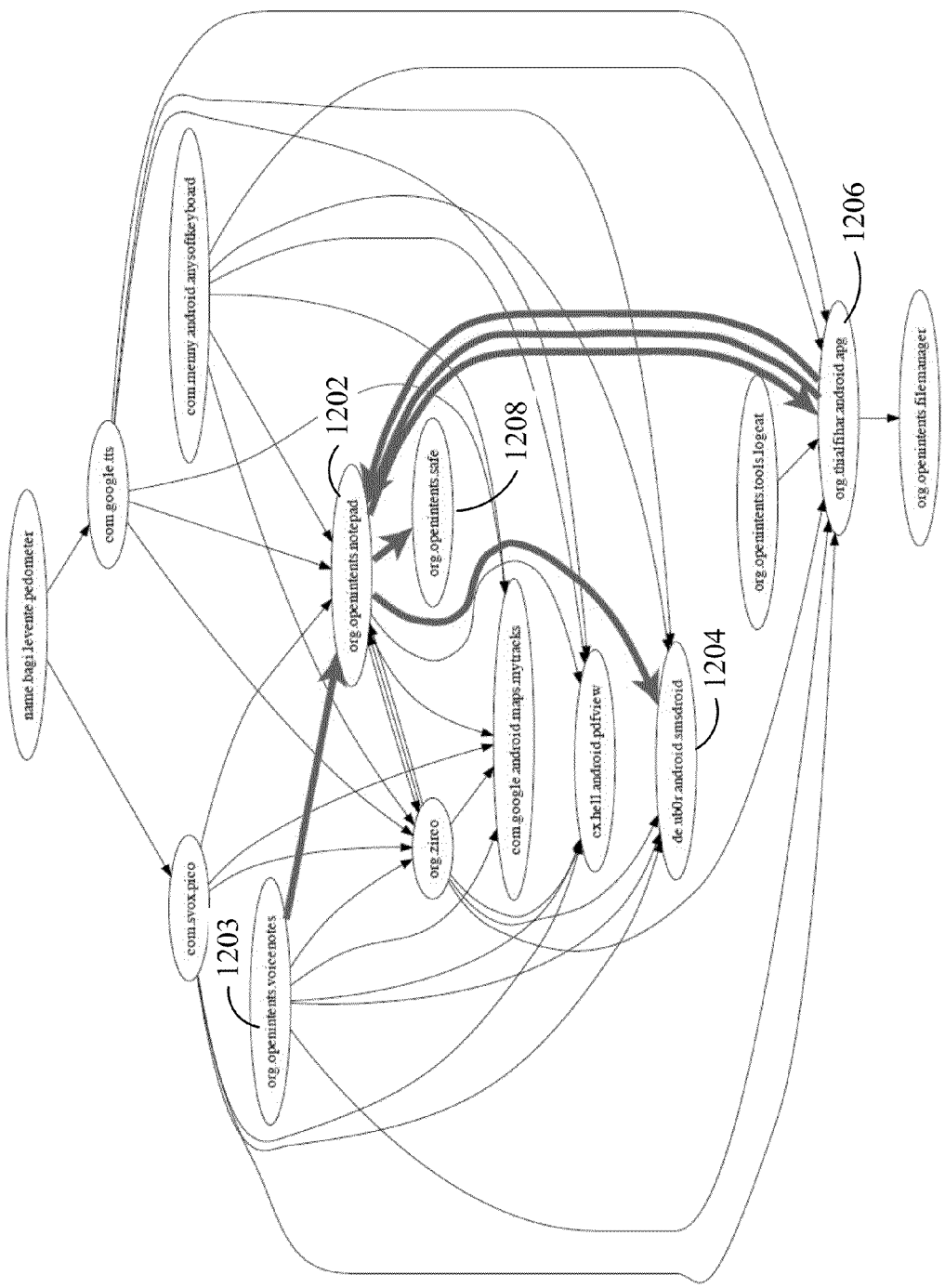
FIG. 12 illustrates possible paths associated with a notebook application that include voice to notes services, text messaging (SMS) services, an encryption application, and a password safe application.

A simple database engine SQLite (version 3.6.12) was used to compute inter-app control flow on a benchmark set of 104 applications. The inter-application component call table contained 3,290 possible intent calls between application components, and an inter-application call table contained 1,152 possible intent calls between applications. Representative inter-application control-flow data is shown in FIG. 11, and a graph of representative calls between applications is shown in FIG. 12. The graph of FIG. 12 shows possible paths associated with a notebook application 1202 that include voice to notes services 1203, text messaging (SMS) services 1204, an encryption application 1206, a password safe application 1208. Such paths can be flagged as violating a security policy.

Figure 9B:
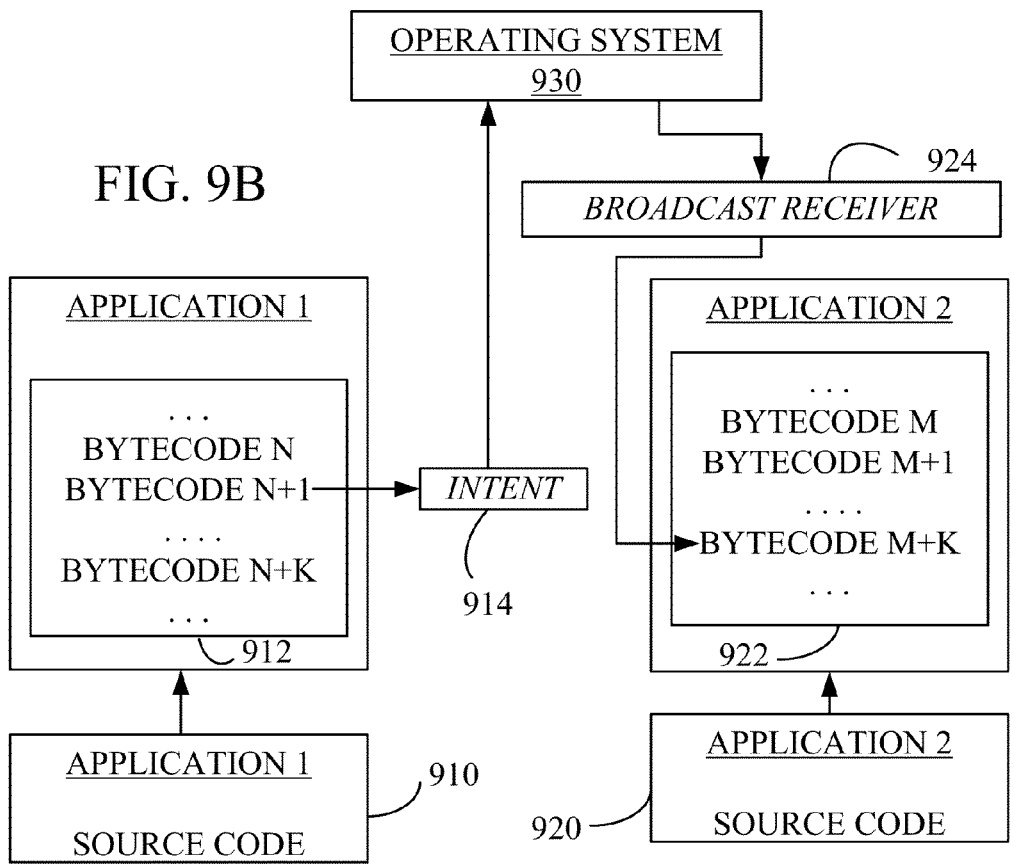
FIGS. 9B-9C illustrate collusion detection based on application bytecodes.

FIG. 9B illustrates identification of potential application collusions between a first and a second application based on associated bytecodes. A first application is shown as being associated with first application source code 910 and first application bytecode 912 that is obtained by compilation of the first application source code 910. The first application bytecode 912 can be executed on a user mobile device or other computing system. Typically, bytecodes are executable on a virtual machine so that application bytecode can be executed on a variety of hardware systems without recompilation of application source code. A second application is shown in association with corresponding source code 920 and bytecode 922. In the example of FIG. 9B, a selected bytecode (N+1) of application 1 is shown as being associated with issuance of an Intent 914 that is directed to an operating system 930. Intents are generally asynchronous messages that include request for services from the operating system 930. The operating system 930 is configured to respond to the Intent and issue one or more messages in response. A selected bytecode (M+K) of the second application can be associated with a Broadcast Receiver 924 so as to receive the message from the operating system 930. Thus, as shown in FIG. 9B, the first application and the second application are interconnected so that collusion is possible. The particular path (and some or all other paths) associated with the Intent 914 and the Broadcast Receiver 924 can be evaluated to determine if this path is permitted under a given security policy.

Figure 9C:
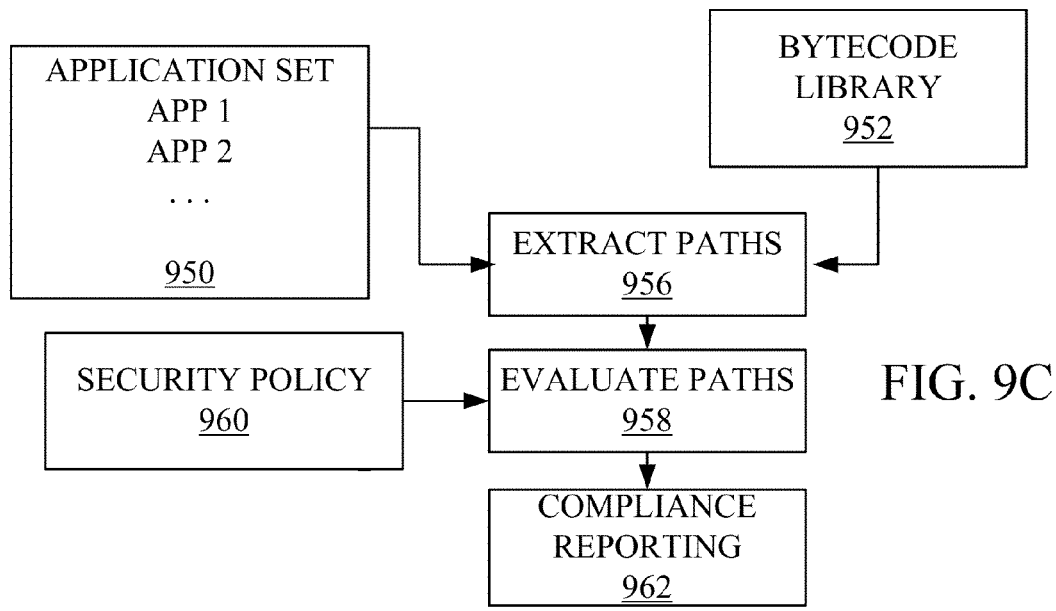

Evaluation for possible collusion by applications based on application bytecode is illustrated in FIG. 9C. Data paths between applications in a set 950 of applications are identified at 956 based on application bytecodes and a bytecode library 952 that is typically associated with executable instructions and operations for a virtual machine. At 958, the identified paths are evaluated in view of a security policy 960. At 962, compliance or non-compliance with the security policy 960 can be reported.

Example 10

Representative Computing Environment

Figure 13:
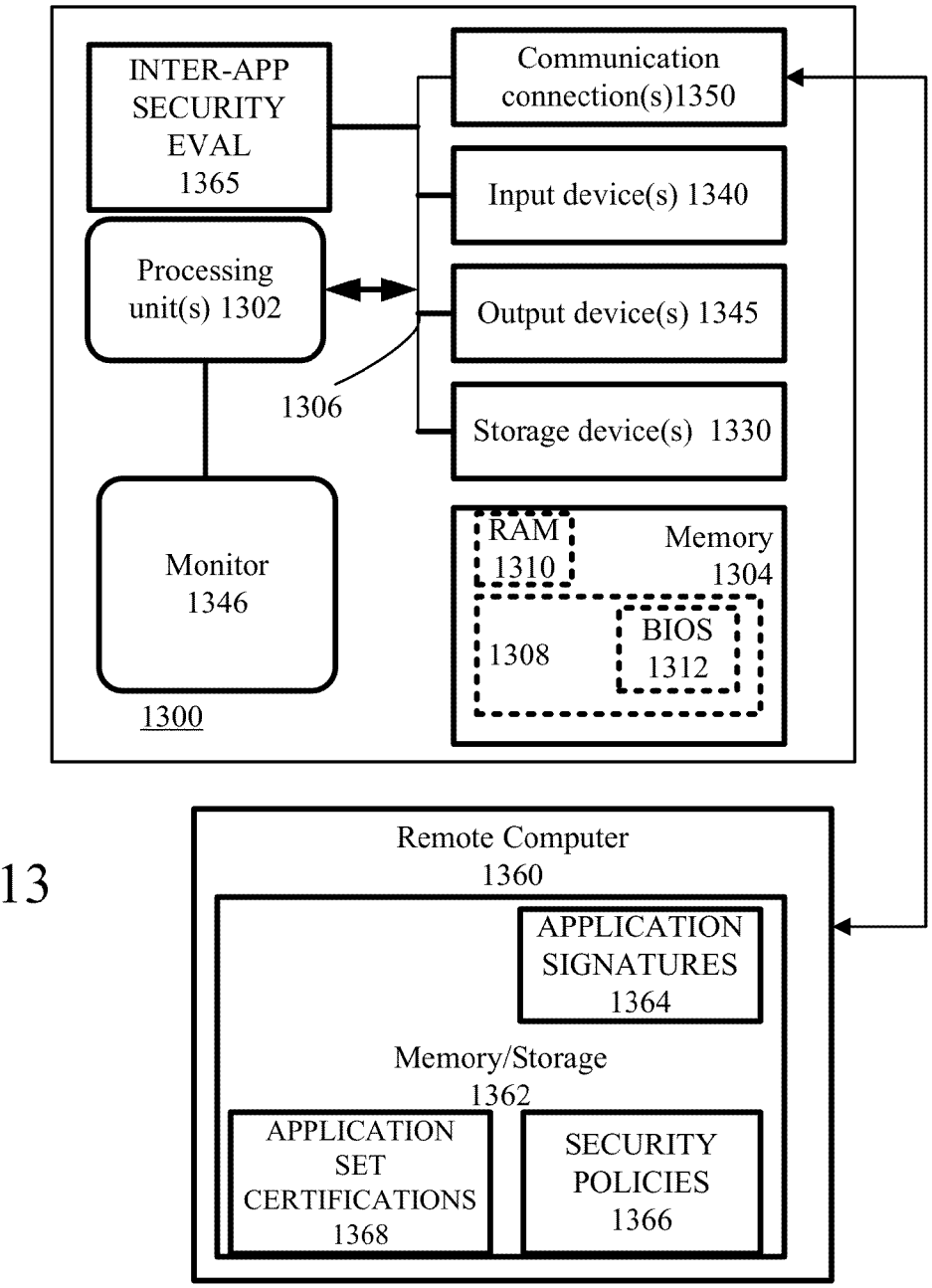
FIG. 13 illustrates a representative computing environment.

FIG. 13 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, an exemplary system for implementing the disclosed technology includes a general purpose computing device in the form of an exemplary conventional PC 1300, including one or more processing units 1302, a system memory 1304, and a system bus 1306 that couples various system components including the system memory 1304 to the one or more processing units 1302. The system bus 1306 may be any of several types of bus structures including a memory bus or memory controller, a peripheral bus, and a local bus using any of a variety of bus architectures. The exemplary system memory 1304 includes read only memory (ROM) 1308 and random access memory (RAM) 1310. A basic input/output system (BIOS) 1312, containing the basic routines that help with the transfer of information between elements within the PC 1300, is stored in ROM 1308.

The exemplary PC 1300 further includes one or more storage devices 1330 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1306 by a hard disk drive interface, a magnetic disk drive interface, and an optical drive interface, respectively. The drives and their associated computer-readable media provide nonvolatile storage of computer-readable instructions, data structures, program modules, and other data for the PC 1300. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1330 including an operating system, one or more application programs, other program modules, and program data. A user may enter commands and information into the PC 1300 through one or more input devices 1340 such as a keyboard and a pointing device such as a mouse. Other input devices may include a digital camera, microphone, joystick, game pad, satellite dish, scanner, or the like. These and other input devices are often connected to the one or more processing units 1302 through a serial port interface that is coupled to the system bus 1306, but may be connected by other interfaces such as a parallel port, game port, or universal serial bus (USB). A monitor 1346 or other type of display device is also connected to the system bus 1306 via an interface, such as a video adapter. Other peripheral output devices, such as speakers and printers (not shown), may be included.

The PC 1300 may operate in a networked environment using logical connections to one or more remote computers, such as a remote computer 1360. In some examples, one or more network or communication connections 1350 are included. The remote computer 1360 may be another PC, a server, a router, a network PC, or a peer device or other common network node, and typically includes many or all of the elements described above relative to the PC 1300, although only a memory storage device 1362 has been illustrated in FIG. 13. The personal computer 1300 and/or the remote computer 1360 can be connected to a local area network (LAN) and a wide area network (WAN). Such networking environments are commonplace in offices, enterprise-wide computer networks, intranets, and the Internet.

When used in a LAN networking environment, the PC 1300 is connected to the LAN through a network interface. When used in a WAN networking environment, the PC 1300 typically includes a modem or other means for establishing communications over the WAN, such as the Internet. In a networked environment, program modules depicted relative to the personal computer 1300, or portions thereof, may be stored in the remote memory storage device or other locations on the LAN or WAN. The network connections shown are exemplary, and other means of establishing a communications link between the computers may be used. As shown in FIG. 13, the remote computer 1360 is configured to store application signatures, security policies, and application set certifications in data storage 1364, 1366, 1368, respectively. The representative computer 1300 is provided with an inter-application security evaluation module that can be stored in a memory 1365, and can provide instructions associated with requests for inter-application security assessments from a remote server, or to perform such assessments and access any necessary databases.

Example 11

Representative Mobile Device

Figure 14:
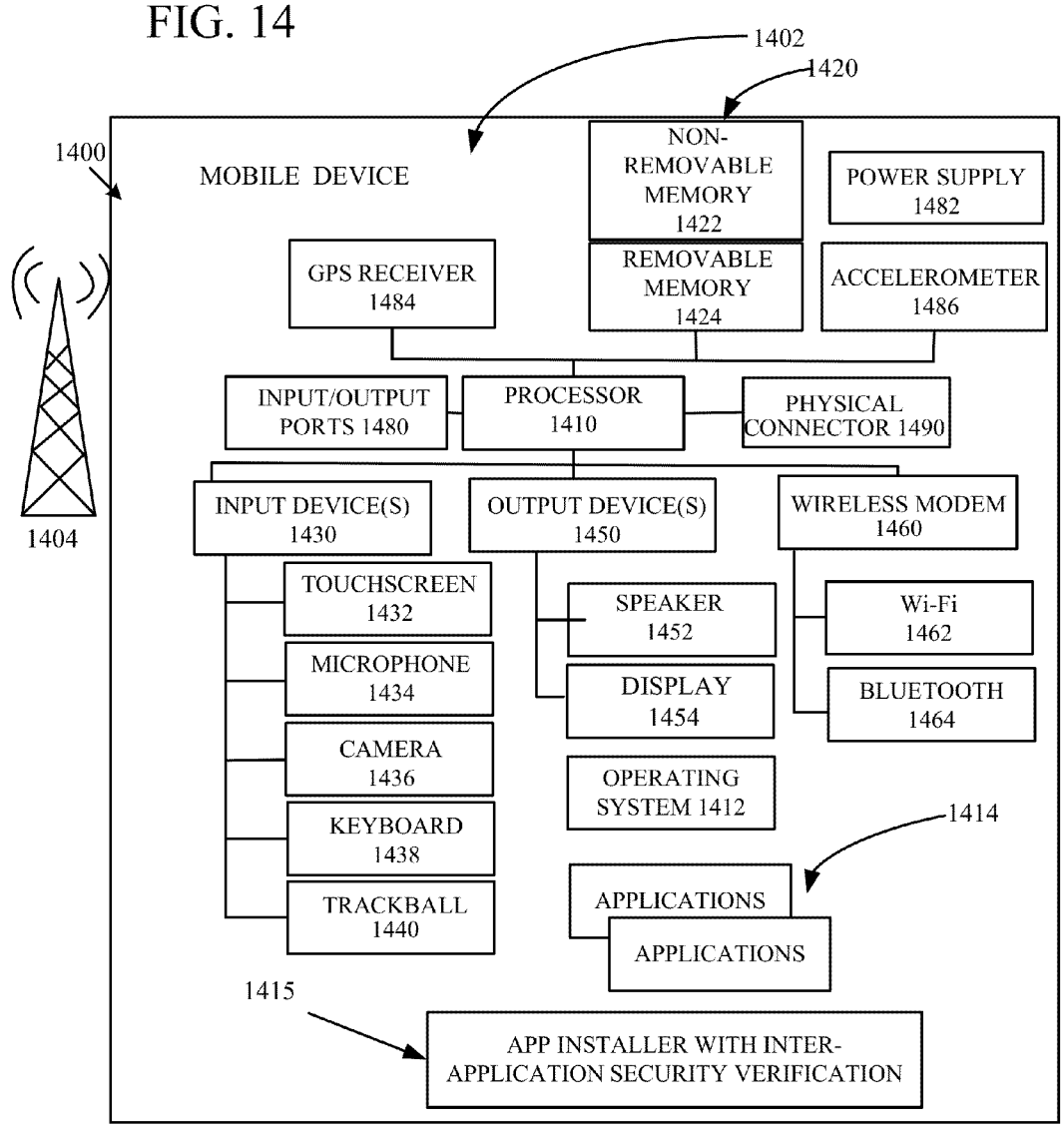
FIG. 14 illustrates a representative mobile device.

FIG. 14 is a system diagram depicting an exemplary mobile device 1400 including a variety of optional hardware and software components, shown generally at 1402. Any components 1402 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1404, such as a cellular or satellite network.

The illustrated mobile device 1400 can include a controller or processor 1410 (e.g., signal processor, microprocessor, ASIC, or other control and processing logic circuitry) for performing such tasks as signal coding, data processing, input/output processing, power control, and/or other functions. An operating system 1412 can control the allocation and usage of the components 1402 and support for one or more application programs 1414. The application programs can include common mobile computing applications (e.g., email applications, calendars, contact managers, web browsers, messaging applications), or any other computing application.

The illustrated mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as smart cards. The memory 1420 can be used for storing data and/or code for running the operating system 1412 and the applications 1414. Example data can include web pages, text, images, sound files, video data, or other data sets to be sent to and/or received from one or more network servers or other devices via one or more wired or wireless networks. The memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1400 can support one or more input devices 1430, such as a touch screen 1432, microphone 1434, camera 1436, physical keyboard 1438 and/or trackball 1440 and one or more output devices 1450, such as a speaker 1452 and a display 1454. Other possible output devices (not shown) can include piezoelectric or other haptic output devices. Some devices can serve more than one input/output function.

For example, touchscreen 1432 and display 1454 can be combined in a single input/output device.

A wireless modem 1460 can be coupled to an antenna (not shown) and can support two-way communications between the processor 1410 and external devices, as is well understood in the art. The modem 1460 is shown generically and can include a cellular modem for communicating with the mobile communication network 1404 and/or other radio-based modems (e.g., Bluetooth or Wi-Fi). The wireless modem 1460 is typically configured for communication with one or more cellular networks, such as a GSM network for data and voice communications within a single cellular network, between cellular networks, or between the mobile device and a public switched telephone network (PSTN).

The mobile device can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components 1402 are not required or all-inclusive, as any components can deleted and other components can be added. As shown in FIG. 14, the mobile device 1400 is provided with computer-executable instructions for an application installer 1415 that provides inter-application security policy verification.

Having described and illustrated the principles of our invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. Alternatives specifically addressed above are merely exemplary and do not constitute all possible alternatives to the embodiments described herein.

We claim:

1. A method, comprising:
   with a processor, evaluating inter-application data flows associated with at least two applications based on a predetermined security policy;
   with the processor, indicating whether or not the at least two applications satisfy the predetermined security policy based on the evaluation; and
   establishing application signatures for the at least two applications, and storing the application signatures, wherein the evaluation of inter-application data flows is based on the stored application signatures and one or more inter-application flow maps associated with the at least two applications;
   wherein the one or more inter-application flow maps associated with the at least two applications are based on bytecodes associated with the at least two applications.

2. The method of claim 1, further comprising indicating that a security policy violation is associated with a particular application of the at least two applications.

3. The method of claim 1, further comprising indicating that at least one of the applications satisfies the predetermined security policy.

4. The method of claim 1, further comprising preparing a certification message based on the evaluation associated with compliance with the predetermined security policy.

5. The method of claim 1, wherein the data flows are associated with data flows from application inputs to application outputs and to and from memory accessed by the applications.

6. The method of claim 1, wherein evaluating the inter-application data flows associated with the at least two applications is based on stored data flows associated with the at least two applications.

7. The method of claim 1, further comprising selecting the security policy from a set of security policies.

8. The method of claim 1, wherein the inter-application flow maps associated with the at least two applications include nodes associated with application inputs, outputs and storage locations, and edges associated with data flows.

9. An application provisioning system, comprising one or more servers configured to:
   provide a listing of a plurality of available applications;
   provide an indication that the applications satisfy a security policy based on inter-application data flows among the available applications; and
   establish application signatures for the plurality of available applications, and store the application signatures, wherein evaluation of inter-application data flows is based on the stored application signatures and inter-application flow maps associated with the plurality of available applications;
   wherein the inter-application flow maps associated with the plurality of available applications are based on bytecodes associated with the plurality of available applications.

10. The application provisioning system of claim 9, wherein the indication of satisfaction of a security policy is based on application certifications associated with at least one application in the plurality of available applications.

11. A method, comprising:
   communicating a list of available applications from a selected network node, each application of the list of available applications associated with at least one inter-application data flow;
   for each of the applications, indicating whether or not the application satisfies a security policy based on inter-application data flows; and
   establishing application signatures for the list of available applications, and storing the application signatures, wherein evaluation of inter-application data flows is based on the stored application signatures and inter-application flow maps associated with the list of available applications;
   wherein the inter-application flow maps associated with the list of available applications are based on bytecodes associated with the list of available applications.

12. The method of claim 11, wherein the security policy corresponds to a received security policy preference.

13. The method of claim 11, wherein the list of available applications is based on a received user security policy preference.

14. At least one non-transitory computer readable medium storing computer-executable instructions for performing a method comprising:
   communicating a list of available applications from a selected network node, each application of the list of available applications associated with at least one inter-application data flow;

for each of the applications, indicating whether or not the application satisfies a security policy based on inter-application data flows; and establishing application signatures for the list of available applications, and storing the application signatures, wherein evaluation of inter-application data flows is based on the stored application signatures and inter-application flow maps associated with the list of available applications;

wherein the inter-application flow maps associated with the list of available applications are based on bytecodes associated with the list of available applications.

15. A method, comprising:

with a processor, selecting a set of applications and a security policy based on inter-application data flows among the set of applications;

with the processor, evaluating the set of applications for inter-application security policy violations based on the selected security policy; and with the processor, transmitting a security certification indicating that the set of applications satisfies the selected security policy if the evaluation fails to detect a security policy violation;

wherein evaluating the set of applications is based on evaluation of the inter-application data flows, stored application signatures for the set of applications, and inter-application flow maps associated with the set of applications;

wherein the inter-application flow maps associated with the set of applications are based on bytecodes associated with the set of applications; and wherein the set of applications is evaluated for inter-application security policy violations based on the selected security policy and package manifests associated with the set of applications, the package manifests identifying components, permissions, and intent filters.

16. The method of claim 15, further comprising at least one of an indication of a security policy or an identification of at least one application of the set of applications in the security certification.

17. The method of claim 16, wherein the application signatures are associated with application control and information flows.

18. The method of claim 15, wherein the set of applications is evaluated for inter-application security policy violations based on bytecodes associated with the set of applications.

* * * * *